US007129653B2

(12) United States Patent
Hudson et al.

(10) Patent No.: US 7,129,653 B2
(45) Date of Patent: Oct. 31, 2006

(54) SELF-CONTAINED, SELF-SNUBBED, HID DIMMING MODULE THAT EXHIBITS NON-ZERO CROSSING DETECTION SWITCHING

(75) Inventors: Christopher A. Hudson, Blacksburg, VA (US); Thomas D. Hirt, Blacksburg, VA (US)

(73) Assignee: Hubbell Incorporated, Orange, CT (US)

( * ) Notice: Subject to any disclaimer, the term of this patent is extended or adjusted under 35 U.S.C. 154(b) by 62 days.

(21) Appl. No.: 10/952,944

(22) Filed: Sep. 30, 2004

(65) Prior Publication Data

US 2006/0066259 A1 Mar. 30, 2006

(51) Int. Cl.
*H05B 37/02* (2006.01)
*H02H 3/00* (2006.01)

(52) U.S. Cl. ...................... 315/291; 315/307; 315/224; 315/244; 315/360; 361/2; 307/132 E

(58) Field of Classification Search ................ 315/291, 315/307, 224, 360, 244–245; 361/2, 56–58, 361/86–87, 91, 126; 307/132 E
See application file for complete search history.

(56) References Cited

U.S. PATENT DOCUMENTS

| | | | | |
|---|---|---|---|---|
| 4,007,404 | A | 2/1977 | Jost et al. | 317/123 |
| 4,286,193 | A * | 8/1981 | King et al. | 315/175 |
| 4,689,547 | A | 8/1987 | Rowen et al. | 323/239 |
| 4,745,351 | A * | 5/1988 | Rowen et al. | 323/239 |
| 4,922,363 | A | 5/1990 | Long et al. | 361/3 |
| 4,937,703 | A | 6/1990 | Adams | 361/187 |
| 5,057,665 | A * | 10/1991 | Gilliland | 219/130.21 |
| 5,162,682 | A | 11/1992 | Lu | 307/631 |
| 5,239,240 | A | 8/1993 | Omori | 315/291 |
| 5,402,302 | A * | 3/1995 | Boucheron | 361/160 |
| 5,463,252 | A | 10/1995 | Jones et al. | 257/723 |
| 5,486,972 | A | 1/1996 | Taylor | 361/154 |
| 5,594,287 | A * | 1/1997 | Cameron | 307/132 E |
| 5,909,108 | A | 6/1999 | He et al. | 323/225 |
| 6,034,853 | A | 3/2000 | Konagata et al. | 361/2 |
| 6,124,684 | A | 9/2000 | Sievers | 315/307 |
| 6,329,767 | B1 | 12/2001 | Sievers | 315/307 |
| 6,650,523 | B1 * | 11/2003 | Kleemeier et al. | 361/93.6 |
| 2004/0165322 | A1 * | 8/2004 | Crawford et al. | 361/2 |

* cited by examiner

*Primary Examiner*—Trinh Vo Dinh
(74) *Attorney, Agent, or Firm*—Alfred N. Goodman; Mark S. Bicks; Christian C. Michel

(57) ABSTRACT

A protection circuit for an HID dimming circuit is provided. A resistive component limits the initial current after a relay closes and current flows from a charged capacitor to a second capacitor. An inductive component limits the rate of change of current through the circuit. A voltage limited device limits voltage across the contacts of a solid state relay. The circuit is preferably formed in a small module that is adapted to be plugged into an HID lighting device.

31 Claims, 6 Drawing Sheets

SELF-CONTAINED, SELF-SNUBBED, HID DIMMING MODULE THAT EXHIBITS NON-ZERO CROSSING DETECTION SWITCHING

FIELD OF THE INVENTION

The present invention relates to protection circuits for high intensity discharge (HID) dimming circuits. More particularly, the present invention relates to a protection circuit for HID lamp dimming circuits including both linear and non-linear components in combination.

BACKGROUND OF THE INVENTION

Conventional HID dimming circuits switch capacitive reactance to effect dimming in an HID lamp. An example of such a circuit is illustrated in FIG. 1. The dimming circuit 100 includes a ballast 102 having an input terminal 104, and output terminal 106, and a common terminal 108. A first capacitor 110 is connected between the ballast output terminal 106 and the common terminal 108. In order to turn a dimming effect on or off, a second parallel capacitor 112 is selectively connected between the ballast output terminal 106 and the common terminal 108 by a relay 114. The capacitors 110, 112 are preferably connected to the relay circuit 114 through capacitor connection terminals 116. The relay 114 is preferably a solid state relay, and typically includes control input terminals 118 to selectively activate the relay and thereby connect the second capacitor 112 to the circuit for full power operation of the lamp (lamp not shown).

When the second capacitor 112 is connected to the circuit, any charge stored in the first capacitor 110 dumps current into the second parallel capacitor 112 until the voltage across both capacitors is equal. This sudden rush of current can damage the circuit, and in particular the contacts 116 of the relay 114 that connect to the capacitor. This phenomenon is exacerbated by the low impedance typically used in HID dimming circuits. Therefore, there is a need to protect the circuit and the capacitor contacts 116 when switching the second capacitor 112 into the circuit.

Conventional lighting devices utilize a special semiconductor feature to switch the capacitive reactance when dimming lighting HID ballasts. This feature is known as zero-voltage switching or ZVS. During ZVS, the device waits for the alternating voltage at the switch contact points to cross zero voltage in order to minimize the onrush of current, prevent contact degradation, and to prolong the life of the switch. Another common practice is to place a snubber circuit in-line with the contacts of a switch to protect the contacts. This will also prolong the life of the switch contacts.

The switch is connected in parallel to the main circuit capacitor and will connect another dimming capacitor into the circuit for full power operation of the luminaire ballast. When the switch closes, any voltage in the main circuit capacitor will dump current into the newly established leg of the dimming capacitor branch. The inrush of current can be substantial if the voltage in the main capacitor is large. When a zero-crossing detection circuit is used in conjunction with a switch, the excessive inrush of current due to a charge stored in the first capacitor is avoided. However, in circuits that lack zero-crossing detection, another protection mechanism is needed.

SUMMARY OF THE INVENTION

The present invention provides a self-contained, snubbed, non-zero-crossing semiconductor switch for use in HID dimming.

According to one embodiment of the invention, a protective circuit for an HID dimming device comprises a relay having two contacts, a resistive device, an inductive device, and a first capacitive device connected in series. A second capacitive device is connected in parallel to the protective circuit. The resistive device is adapted to limit an initial inrush of current between the capacitive devices when the relay is closed. The inductive device is adapted to limit the rate at which the current between the capacitive devices changes. A voltage limiting device connected between the relay contacts is adapted to prevent a voltage across the relay contacts from exceeding a predetermined threshold.

According to another embodiment of the present invention, a method of protecting an HID dimming device comprises the steps of preventing an initial current between at least two capacitors that are adapted to be connected when a relay closes, limiting the rate of change of current between the two capacitors to below a predetermined frequency, and limiting the voltage across two contacts of the relay to below a rated voltage.

According to yet another embodiment of the present invention, a dimming module comprises a relay having two control contacts and two switch contacts. The switch contacts are adapted to be connected to first and second capacitors, respectively. The dimming module includes a protection circuit comprising a resistive device adapted to limit an initial current between the capacitive devices when the relay is closed. An inductive element is adapted to limit the rate of change of current between the capacitive devices, and a voltage limiting device is connected between the relay contacts, and is adapted to prevent a voltage across the relay contacts from exceeding a predetermined threshold.

According to another embodiment of the invention, a discrete snubbed control drive is provided. The discrete design preferably comprises two printed circuit boards (PCB's) contained within an enclosed non-conductive housing. One PCB preferably contains the input drive electronics and solid state switch, while the other PCB preferably contains the snubber circuit. The snubber circuit comprises linear and non-linear components. The discrete snubbed control drive is physically adapted to be inserted into a relay socket externally mounted to a HID luminaire.

BRIEF DESCRIPTION OF THE DRAWINGS

The invention will be more readily understood with reference to the embodiments thereof illustrated in the accompanying drawings, in which.

Throughout the drawings, it will be understood that like numerals refer to like features and structures.

DETAILED DESCRIPTION OF THE PREFERRED EMBODIMENTS

Figure 1:
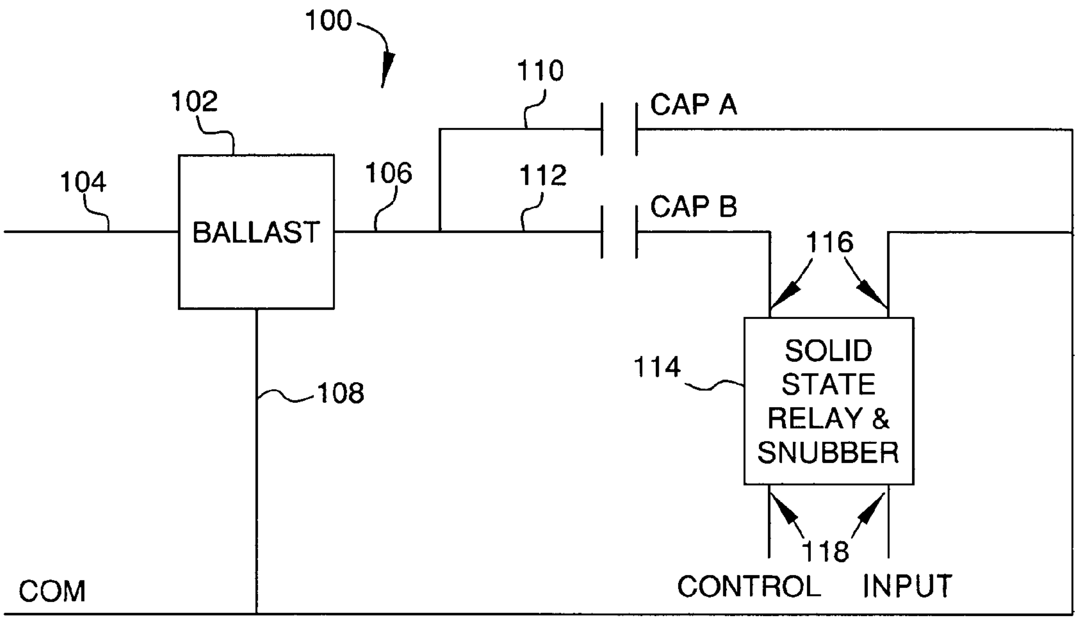
FIG. 1 ( Prior Art )
FIG. 1 illustrates a conventional HID dimming circuit.
Figure 2:
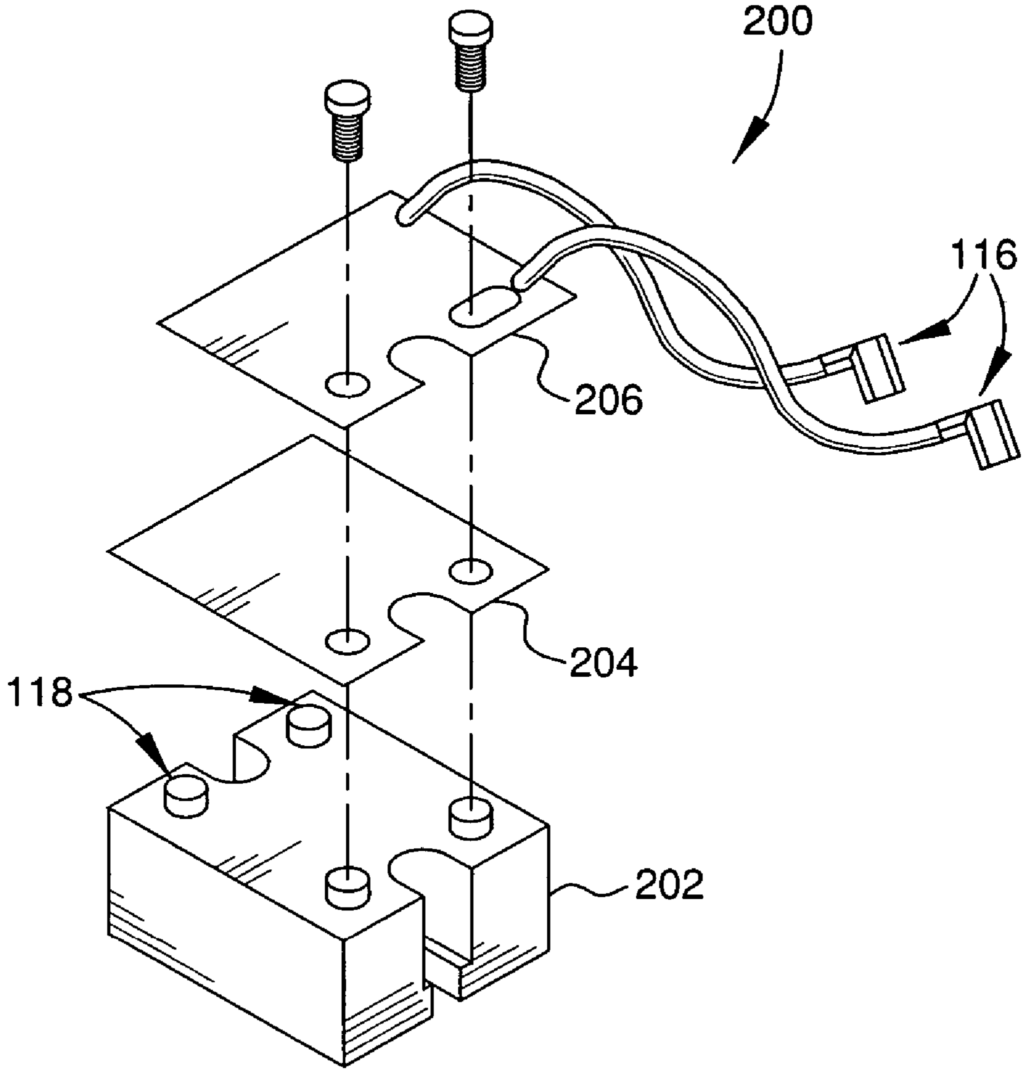
FIG. 2 illustrates a snubber circuit mounted to a solid state relay in accordance with an embodiment of the present invention.

The preferred embodiments of the invention will now be described with reference to the attached drawings. FIG. 2 shows a device 200 according to an embodiment of the invention. The device 200 preferably includes a solid state, non-zero-cross detecting relay 202, an insulation layer 204, and a printed circuit board (PCB) comprising a snubber circuit 206 according to an embodiment of the present invention. The snubber circuit board 206 includes capacitor connections 116. The relay 202 includes control input terminals 118.

Figure 3:
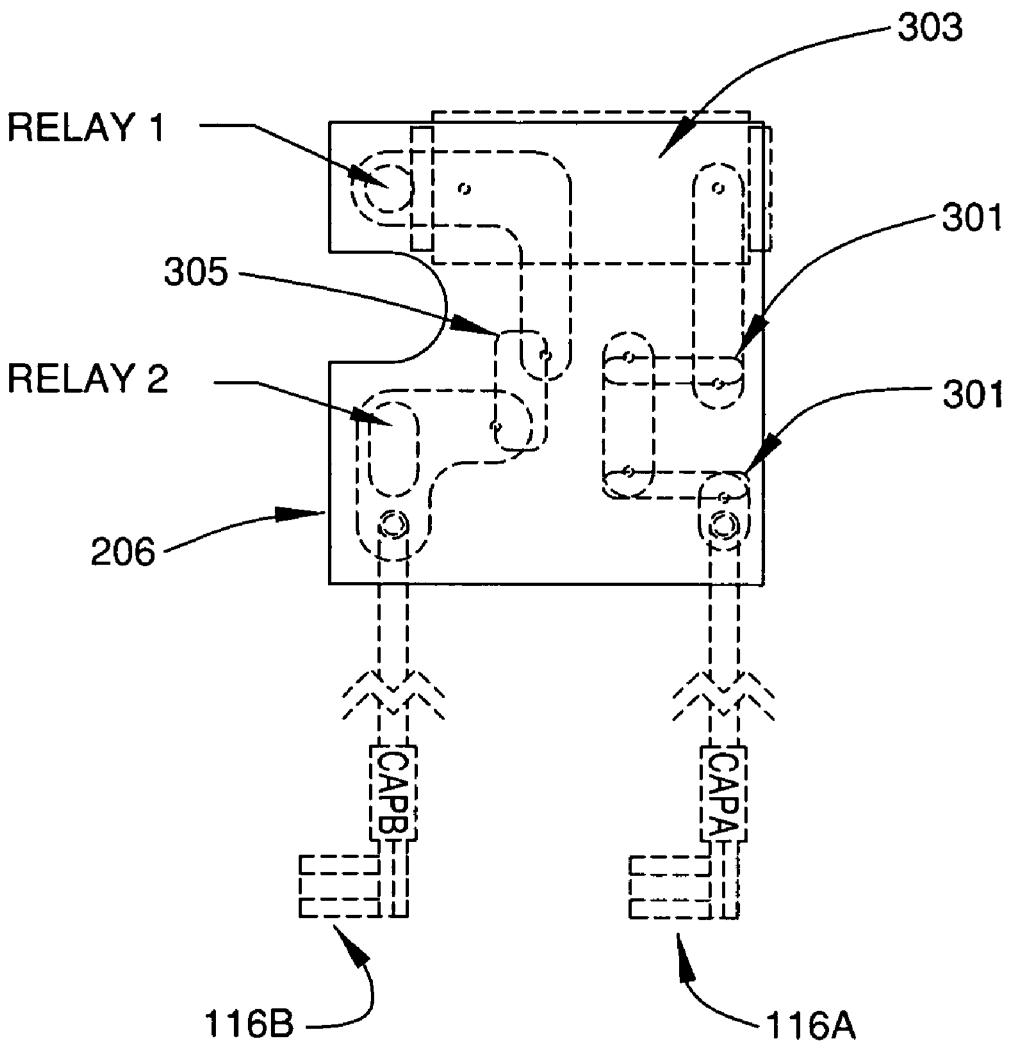
FIG. 3 is an overview of a snubber circuit in accordance with an embodiment of the present invention.

FIG. 3 illustrates the snubber circuit 206 of FIG. 2 in further detail. The snubber circuit 206 is preferably a PCB with a compact design. A first capacitor terminal 116A is adapted to be connected to the first capacitor 110. A second capacitor terminal 116B is adapted to be connected to the second capacitor 112. A combination of circuit components are connected in series between the capacitor terminals 116A, 116B in order to protect the contact terminals 116A, 116B and the solid state relay. A negative temperature coefficient (NTC) thermistor 301 is provided to prevent the initial inrush of current. NTC's are thermally sensitive resistors, typically made from semiconductors, which show a decrease in resistance as temperature increases. The negative temperature coefficients of resistance are typically about ten times greater than those of metals and five times greater than those of silicon temperature sensors. Changes in the resistance of an NTC thermistor can be brought about by a change in ambient temperature or internally by self-heating resulting from a current flowing through the device. In embodiments of the present invention, the resistance of the NTC thermistor is initially relatively high. This prevents an excessive initial current from damaging the semiconductor relay device or capacitors contacts in the circuit. After a duration of time with current flowing through the NTC device, the resistance in the NTC drops until it is negligible due to internal heating. More than one NTC thermistor may be connected in series, as shown in FIG. 3.

The NTC thermisor 301 is connected to a second circuit component 303 that prevents high frequency changes in current, such as an inductor. Without such a component, when the relay closes, the change in current would be very rapid, as charge flows from the first capacitor 110 into the second capacitor 112. Such a rapid change relates to a high current density, which can damage the semiconductor relay and cause it to fail. Thus, the change in current through the semiconductor contacts is advantageously limited by the inductor 303 to lower frequencies that are tolerable to the semiconductor relay contacts and the capacitors between terminals 116A, 116B.

The third component of the protection circuit according to an embodiment of the present invention is another non-linear component, preferably a metal oxide varistor (MOV) 305, which protects the contacts of the semiconductor relay from over-voltage. Thus, if there is an excessive RMS or peak voltage across the semiconductor relay contacts, forced conduction is avoided by the MOV 305, which bleeds off excessive voltage. The MOV 305 is selected to permit voltages up to a predetermined threshold, and to begin to conduct at higher voltages so that current flows through the MOV 305 rather than being forced through semiconductor contacts.

Figure 4:
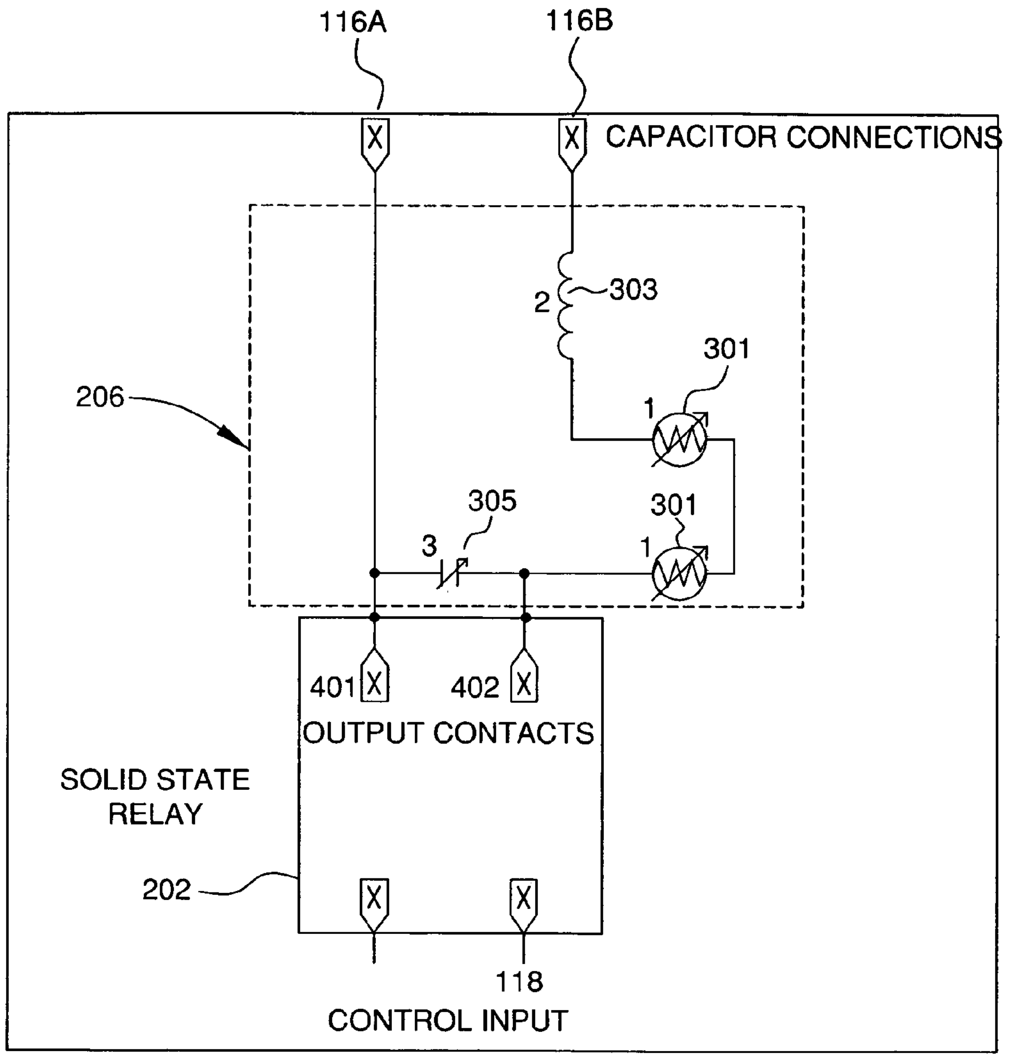
FIG. 4 is a schematic illustration of a snubber circuit according to an embodiment of the present invention.

FIG. 4 is a schematic diagram of an embodiment of the present invention. Solid state relay 202 has control inputs 118 and output contacts 401, 402. The output contacts 401, 402 connect the relay 202 to the snubber circuit 206. The snubber circuit comprises one or more NTC's 301 in series with an inductor 303. The snubber circuit 206 includes capacitor contacts 116A, 116B. A MOV 305 is connected between the output contacts 401, 402 to protect the solid state relay 202 from over-voltage as described above.

The operation of a snubber circuit according to an embodiment of the present invention will now be described. A control signal is applied to the input control terminals. The solid state relay processes the signal and correspondingly adjusts the state of its semiconductor contacts to closed or short. The voltage across the main circuit capacitor, CAP A, will collapse and dump current through CAP B, snubber circuit 206 and the relay 202. The direction is dependent upon the direction and polarity of AC voltage contained in CAP A. During every switch cycle, the voltage across CAP B will be in the opposite polarity of the current direction of current flow. This magnifies the inrush current effect, thus increasing the size of the snubber required for proper relay contact protection. Once the contacts are closed, the two capacitors will tend towards equilibrium potential and then be driven by the ballast, HID lamp circuit. It is the snubber circuit's job to facilitate the equilibrium acquisition while not allowing the circuit to run away to the point of damaging the relay 202 or the HID circuit components.

The behavior of the snubber circuit 206 according to an embodiment of the present invention is two-fold during the inrush of current (the degree depending on the phase of voltage when the relay contact is closed). One component 301 limits the magnitude of the initial inrush and another 303 controls the frequency current inrush. The first component 301, an negative thermal coefficient (NTC) thermistor starts out as a high impedance resistor. As current continues to flow through the component, it thermally excites, or heats up, and the impedance decreases in the component. During steady state operation of the relay, the impedance of this component is minimal, and is effectively invisible to the rest of the ballast circuit.

When the contacts close, the inrush current would normally have a very steep edge to the signal. The edge directly relates to the current density seen in the relay contacts. The steeper the edge, the higher the current density. If the density gets too high, the semiconductor contact or switch will fail. The inductor 303 prevents the edge from attaining too steep a front, thus limiting the current density of the semiconductor contact. Inductor 303 preferably has high impedance to high frequency signals, and low impedance to 60 Hz signals. Thus the inductor 303 is essentially invisible to 60 Hz line current.

A third part 305, preferably a metal oxide varistor (MOV), protects the contacts of the semiconductor from over-voltage. When the semiconductor switch opens, there is a sharp rise in the average and peak voltage seen across the contacts. The semiconductor contacts are made to withstand a certain amount of voltage. If the contacts experience anything higher than their rated voltage, they can begin to conduct. Excessive, forced conduction will eventually fail the relay 202. The MOV 305 advantageously conducts current through itself to bleed off the excessive voltage, rather than current being forced through the semiconductor contacts. FIG. 4 illustrates the electrical current branches that exist on the snubber circuit 206.

Those of ordinary skill in the art will appreciate that any similar arrangement of components, including gaseous breakover devices, TVS, Zener diodes, and so on, can be used to provide a similar protection feature. Also, any combination of NTC's, resistors or the like can be used in the snubber circuit 206 to address the inrush current issue.

Referring to FIG. 4, during turn on, current enters one side of the snubber circuit 206 (through output contact 401 or 402) passes through the choke 303, and then through the NTC device(s) 301. The inrush current is directed then through the contacts of the relay and back out to the rest of the system. The same path is used both ways for the AC current that flows, thus a bilateral semiconductor switch is required.

During turn off, the switch contacts open and break the inductive ballast current flowing through the device 206. The voltage across the contacts jumps up to dangerous levels due to the inductive current reversal. This is known as voltage boosting and is commonly used in DC power supply design. However, in this instance, the voltage boost is considered detrimental to the semiconductor switch and can destroy the switch. In addition, the ballast capacitor (not shown) holds the voltage increase as DC over several cycles as the capacitor slowly discharges. A MOV component 305 is placed across the contacts to prevent the maximum voltage from exceeding dangerous instantaneous levels and to facilitate the expeditious discharge of the DC component contained on the ballast capacitor.

FIG. 2 illustrates an embodiment of the present invention. The module 600 shown is compact, and includes a solid state relay. The circuit board 602 is designed for ease of assembly and implementation into a lighting fixture. The PCB is mounted directly onto the solid state relay and its physical boundaries are no larger than the outline of the relay's edges. There is preferably a notch in the board to provide access to the mount holes located in the relay base. The shape, form, function of solid state relays is an industry accepted form. Therefore, the preferred embodiment of the snubber board according to an embodiment of the present invention conforms to the shape and function of the solid state relay.

Figure 5:
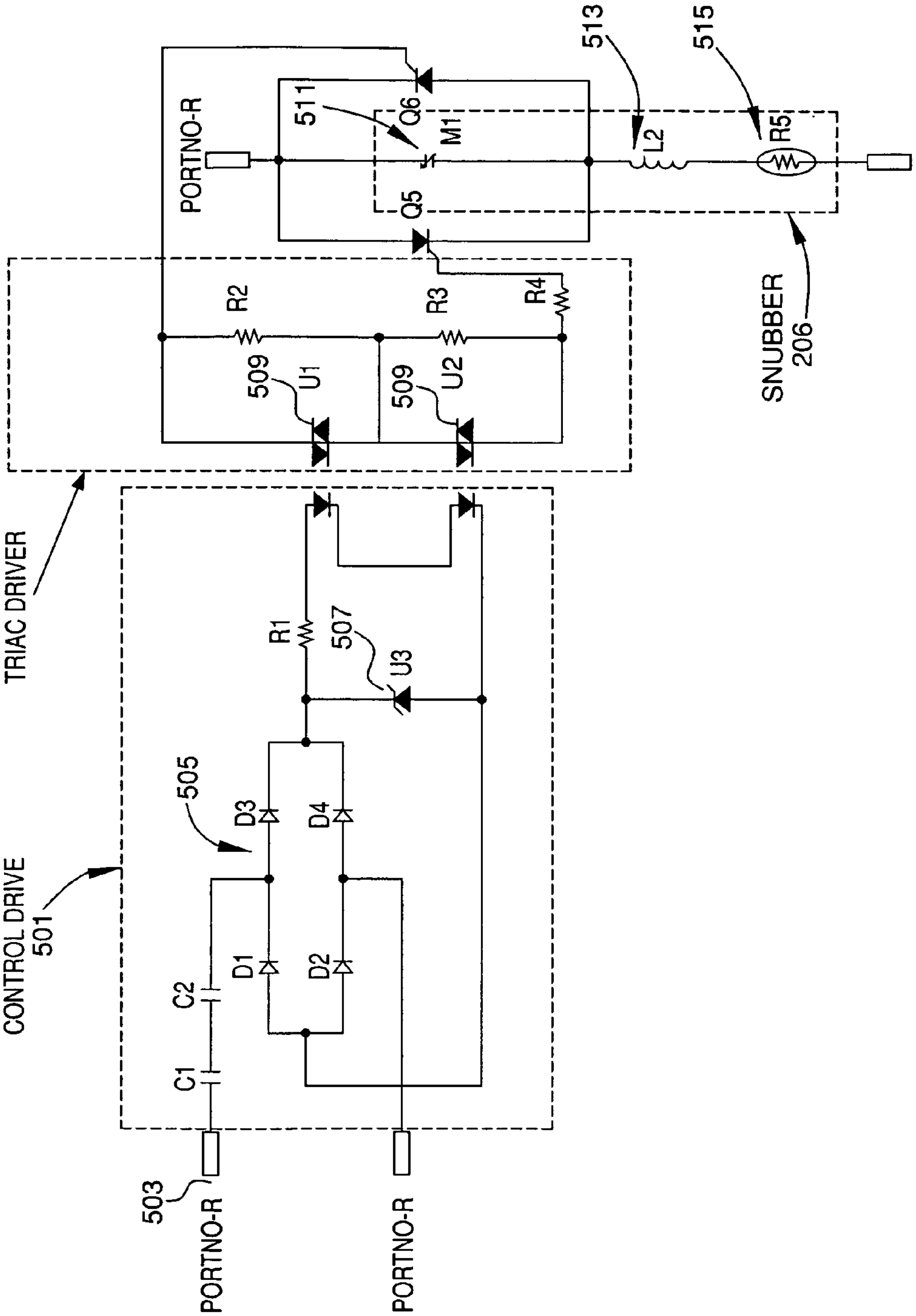
FIG. 5 is an illustration of a discrete dimming circuit according to another embodiment of the invention.

FIG. 5 illustrates a second embodiment of the present invention. A description of the features common to previously described embodiments will be omitted for conciseness.

A drive circuit 501 made up of capacitors C1, C2, diodes D1–D4, Zener diode U3, resistor R1 and optocouplers U1 and U2 is provided. The AC control signal enters into the control input terminal 503, which decreases the input voltage significantly via capacitive reactance. The AC signal proceeds through the diode bridge 505 which rectifies the AC signal into a DC signal. However, the rectified signal alternates with a 120 Hz harmonic still present in the rectified signal. The Zener diode 507 limits the magnitude of this voltage to an acceptable level that the optocouplers can handle. There is a regulating effect due to the zener that provides a wide input range under which the solid state relay will still operate. Resistor R1 will prevent current overload. Someone skilled in the art will recognize that a capacitor (not shown) can be placed across the optocoupler inputs to provide some filtering for even greater regulation of the input range. When the appropriate signal level enters the optocouplers, the output triac drivers 509 will activate and become conductors. Resistors R2 and R3 insure that the load is shared equally by each driver by providing some AC biasing to the outputs of the optocouplers for protection.

When voltage is biased positively at either the Q5 anode or the Q6 anode and the triac drivers are conducting, current will flow in the silicon controlled rectifier (SCR) parts 510 in their respectively biased direction. This means that if Q5 is positively biased, anode to cathode, current will flow in it. Q6 is effectively the same. Thus the back to back SCR's 510 act as a solid state, bilateral switch or relay activated via an input control signal. The Q5/Q6 trigger gates are at almost the same potential of the cathode terminals. Thus if the triac drives 509 are conducting and current is flowing counterclockwise through the triac drives 509, the Q5 trigger current will flow into the gate thus turning on the part Q5. The current through Q5 flows counterclockwise only when Q5 is forward biased. The path of the current starts from the anode side of Q5 relay terminal through the cathode of Q6. Then the current comes out of the trigger gate of Q6 around the optocoupler loop whose driver current is limited by R4, and then into the Q5 trigger gate and out of the cathode at Q5 and on to the snubber circuit 206. This path turns on Q5 due to the forward, positive, biasing on Q5 part. Just the opposite occurs when the AC voltage across the Q5/Q6 pair inverts and forward biases Q6. The active control of the triac drivers provides the path for the SCR pair 510 to conduct depending on which one is forward biased.

Component M1 (MOV) 511 prevents turn-off voltage surge on the external load from forcing the conduction path through the SCR's to avalanche. This prevents premature failure from over-voltage as described above. The component L2 513 prevents the change in current (di/dt) from being too high, thus limiting the current density in the semiconductor switches. R5 (NTC) 515 limits the initial magnitude of the inrush current to acceptable repetitive peak levels.

Figure 6A:
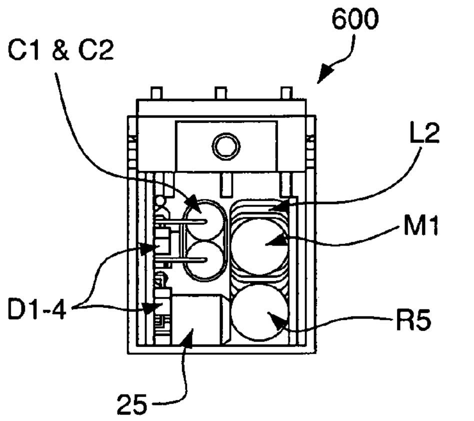
FIGS. 6A and 6B are illustrations of the physical embodiment of the dimming circuit of FIG. 5.
Figure 6B:
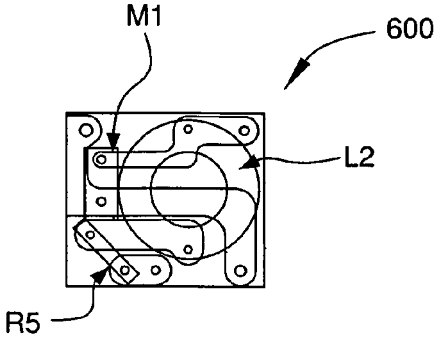

FIGS. 6A–6B illustrate another embodiment of the invention. Dimming module 600 comprises a compact non-conductive housing 602 containing drive circuitry and a snubber circuit. The drive circuitry and snubber circuit can preferably be provided on two printed circuit boards (PCB's) 604, 606 arranged to face each other within the housing 602. External terminals 608 are provided to connect the module 600 to a socket base mounted externally on a HID luminaire. The self-contained, plug-in style unit can be plugged into the external mount to provide snubbed dimming functionality to existing HID luminaires having the appropriate dimming circuitry.

Figure 7A:
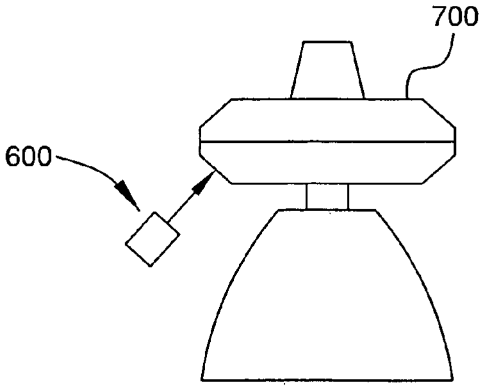
FIGS. 7A and 7B illustrate a snubber circuit incorporated into a lighting fixture according to an embodiment of the invention.
Figure 7B:
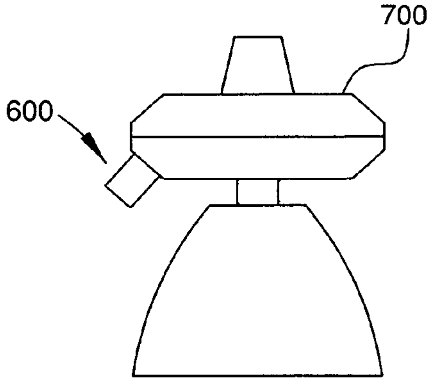

FIGS. 7A and 7B illustrate the snubber circuit 600 of FIGS. 6A-6B as it is incorporated into a lighting fixture 700.

While the invention herein disclosed has been described by means of specific embodiments and applications thereof, numerous modifications and variations can be made thereto by those skilled in the art without departing from the scope of the invention as set forth in the claims.

What is claimed is:

1. A protective circuit for an HID dimming device comprising:

a relay having two contacts, a resistive device and an inductive device connected in series between a first capacitive device and a second capacitive device, said resistive device adapted to limit an initial current between said capacitive devices when said relay is closed, said inductive device adapted to limit the rate at which said current between said capacitive devices changes; and a voltage limiting device connected between said relay contacts and adapted to prevent a voltage across said relay contacts from exceeding a predetermined threshold.

2. The protective circuit of claim 1, wherein said resistive device is a negative temperature coefficient (NTC) thermistor.

3. The protective circuit of claim 1, comprising a plurality of said resistive devices.

4. The protective circuit of claim 1, wherein said inductive device is adapted to pass frequencies below a predetermined cut-off frequency that is above the operating frequency of an HID lamp connected to the HID dimming device.

5. The protective circuit of claim 1, wherein the voltage limiting device is a metal oxide varistor (MOV).

6. The protective circuit of claim 1, wherein the voltage limiting device is a zener diode.

7. The protective circuit of claim 1, wherein said voltage limiting device becomes conductive if said voltage between said relay contacts:exceeds said predetermined threshold.

8. The protective circuit of claim 1, wherein said relay is a solid state relay.

9. A dimming module comprising:

a relay having two input control contacts and two output contacts adapted to be connected to first and second capacitors;

a protection circuit comprising a resistive device adapted to limit an initial current between said capacitors when said relay is closed, an inductive device adapted to limit the rate of change of current between said capacitors, and a voltage limiting device connected between the relay contacts and adapted to prevent a voltage, across said relay contacts from exceeding a predetermined threshold.

10. The dimming module of claim 9, wherein the predetermined threshold is at or below the rated voltage of the relay.

11. The dimming module of claim 9, wherein the relay is a solid state relay.

12. The dimming module of claim 9, wherein the resistive device is a negative temperature coefficient (NTC) thermistor.

13. The dimming module of claim 9, comprising a plurality of resistive devices.

14. The dimming module of claim 9, wherein the inductive device is adapted to pass frequencies below a predetermined cut-off frequency that is above the operating frequency of an HID lamp connected to the dimming module.

15. The dimming module of claim 9, wherein the voltage limiting device is a metal oxide varistor (MOV).

16. The dimming module of claim 9, wherein the voltage limiting device is a zener diode.

17. The dimming module of claim 9, wherein said voltage limiting device becomes conductive if said voltage between said relay contacts exceeds said predetermined threshold.

18. The dimming module of claim 9, wherein said module is adapted to be plugged into a relay socket of a HID lighting device.

19. The dimming module of claim 9, wherein said resistive device, said inductive device, and said voltage limiting device are mounted on a printed circuit board.

20. The dimming module of claim 19, wherein said PCB is adapted to be the same or smaller in size than said relay.

21. The dimming module of claim 20, wherein said PCB comprises a notch corresponding to a mounting hole of said relay.

22. An HID dimming module comprising:

a non-conductive housing containing a dimming control drive for an HID lamp and a snubber circuit;

terminals extending from said housing adapted to connect said dimming module to a relay socket of a HID lighting device;

wherein said snubber circuit comprises a relay having two contacts, a resistive device and an inductive device connected in series between a first capacitive device and a second capacitive device, said resistive device adapted to limit an initial current between said capacitive devices when said relay is closed, said inductive device adapted to limit the rate at which said current between said capacitive devices changes; and a voltage limiting device connected between said relay contacts and adapted to prevent a voltage across said relay contacts from exceeding a predetermined threshold.

23. The dimming module of claim 22, wherein said resistive device is a negative temperature coefficient (NTC) thermistor.

24. The dimming module of claim 22, comprising a plurality of said resistive devices.

25. The dimming module of claim 22, wherein said inductive device is adapted to pass frequencies below a predetermined cut-off frequency that is above the operating frequency of an HID lamp connected to the HID dimming device.

26. The dimming module of claim 22, wherein the voltage limiting device is a metal oxide varistor (MOV).

27. The dimming module of claim 22, wherein the voltage limiting device is a zener diode.

28. The dimming module of claim 22, wherein said voltage limiting device becomes conductive if said voltage between said relay contacts exceeds said predetermined threshold.

29. The dimming module of claim 22, wherein said relay is a solid state relay.

30. The dimming module of claim 22, wherein the dimming control drive comprises a first PCB and the snubber circuit comprises a second PCB.

31. The dimming module of claim 30, wherein the first PCB and the second PCB are mounted within said housing facing each other.

* * * * *